US 8,150,565 B2

(12) United States Patent
Wachenheim et al.

(10) Patent No.: US 8,150,565 B2
(45) Date of Patent: Apr. 3, 2012

(54) METHOD AND DEVICE FOR AIDING THE PILOTING OF AN AIRCRAFT TO PREPARE A PHASE OF DESCENT

(75) Inventors: Maxime Wachenheim, Toulouse (FR); Jean-Louis De Menorval, Aussonne (FR)

(73) Assignee: Airbus Operations SAS, Toulouse (FR)

( * ) Notice: Subject to any disclaimer, the term of this patent is extended or adjusted under 35 U.S.C. 154(b) by 669 days.

(21) Appl. No.: 12/256,083

(22) Filed: Oct. 22, 2008

(65) Prior Publication Data

US 2009/0112454 A1    Apr. 30, 2009

(30) Foreign Application Priority Data

Oct. 31, 2007    (FR) ..................... 07 07661

(51) Int. Cl.
   *G05D 1/00*    (2006.01)
(52) U.S. Cl. ................. 701/5; 701/7; 701/121
(58) Field of Classification Search .............. 701/3, 5, 701/7, 121, 204, 206, 66
   See application file for complete search history.

(56) References Cited

U.S. PATENT DOCUMENTS

| 4,774,670 | A | * | 9/1988 | Palmieri ........................ 701/204 |
| 5,051,910 | A | | 9/1991 | Liden |
| 5,121,325 | A | * | 6/1992 | DeJonge ........................ 701/123 |
| 5,408,413 | A | | 4/1995 | Gonser et al. |
| 6,507,782 | B1 | | 1/2003 | Rumbo et al. |
| 7,283,895 | B2 | * | 10/2007 | Bouchet ............................ 701/3 |
| 8,010,267 | B2 | * | 8/2011 | Klooster et al. ................ 701/66 |
| 2008/0300738 | A1 | * | 12/2008 | Coulmeau et al. ................ 701/3 |
| 2010/0125382 | A1 | * | 5/2010 | Wachenheim et al. ......... 701/18 |
| 2010/0217459 | A1 | * | 8/2010 | Caillaud et al. .................... 701/3 |

FOREIGN PATENT DOCUMENTS

| FR | 2 749 933 A1 | 12/1997 |
| FR | 1 564 527 A1 | 8/2005 |

* cited by examiner

*Primary Examiner* — Joseph C Rodriguez
(74) *Attorney, Agent, or Firm* — Oblon, Spivak, McClelland, Maier & Neustadt, L.L.P.

(57) ABSTRACT

A method and device for aiding the piloting of an aircraft while respecting a time of arrival constraint at a first waypoint during a phase of descent. The method includes calculating an instant of arrival of the aircraft at an intermediate waypoint, in such a way that an estimated latest time of arrival at the first waypoint, corresponding to a minimum speed profile, occurs later by a predetermined first margin than the time of arrival constraint; determining a first speed profile between a current position of the aircraft and the intermediate waypoint, such that the intermediate waypoint is crossed at the calculated instant of arrival; determining a second speed profile, such that the first waypoint is crossed within the time of arrival constraint, starting from the intermediate waypoint at the calculated instant of arrival; and piloting the aircraft according to the first and then second speed profiles.

9 Claims, 3 Drawing Sheets

METHOD AND DEVICE FOR AIDING THE PILOTING OF AN AIRCRAFT TO PREPARE A PHASE OF DESCENT

BACKGROUND OF THE INVENTION

I. Field of the Invention

The present invention relates to a method and a device for aiding the piloting of an aircraft, which are intended to aid in respecting a time of arrival constraint at a waypoint during a phase of descent of the aircraft.

II. Description of Related Art

Piloting of aircraft, especially of modern civil transportation aircraft, generally takes place along a flight plan composed of a set of points of arrival ("waypoints" in English) defined in three-dimensional space. The aircraft must be guided along the flight plan by respecting a maximum margin of error of position relative to segments connecting the different waypoints. More and more often, especially in zones of high traffic density, at least some of the waypoints of the flight plan involve a time of arrival constraint, generally known as RTA ("Required Time of Arrival" in English), imposed by the air traffic controller in order to guarantee satisfactory separation of different aircraft. In such a case, the aircraft must be guided along the flight plan by additionally respecting a maximum margin of error in time relative to the RTA constraints on the different waypoints involving such a constraint. Because of the fact of convergence of different aircraft, the zones of approach to airports, in which the aircraft are often in a phase of descent, often correspond to zones of high traffic density in which the air traffic controller tends to impose RTA constraints. Consequently, the aircraft must be capable of respecting a time of arrival constraint RTA at a waypoint corresponding in a flight plan to a phase of descent.

In modern aircraft, the pilots may enter time of arrival constraints RTA associated with waypoints into a flight plan within a flight management system of FMS type ("Flight Management System" in English). The FMS formulates a speed profile associated with a reference trajectory, taking each RTA constraint into account. For this purpose it takes into account the flight conditions known during formulation of the said speed profile, especially the predictions of wind, temperature, etc. along the said trajectory.

U.S. Pat. No. 5,121,325 describes a system for determining a range of estimated times of arrival of an aircraft at a particular point. These estimated times of arrival are generally referred to as ETA ("Estimated Time of Arrival" in English). The earliest time of arrival ETAmin and the latest time of arrival ETAmax correspond to the cases in which the airplane flies the scheduled trajectory at respectively the maximum and minimum possible speeds over this trajectory. The estimated times of arrival are calculated as a function of the flight conditions, especially wind, known to the FMS.

In modern aircraft, during insertion of an RTA constraint into a flight plan, the FMS determines a speed profile for the scheduled trajectory, such that an estimated time of arrival ETA calculated for this speed profile corresponds to the RTA constraint at the waypoint under consideration. Nevertheless, it is frequent that the real flight conditions while the aircraft is flying the trajectory differ substantially from the flight conditions known to the FMS. In particular, the wind intensity and/or direction may have varied compared with the forecasts. Consequently, the calculated speed profile does not permit the RTA constraint to be respected. For example, a headwind of intensity greater than that forecast value slows the forecast progress of the aircraft: the time at which the aircraft arrives at the waypoint under consideration would be later than the RTA constraint if it continued to fly according to this speed profile. With a view to respecting the RTA constraint when the difference between the estimated time of arrival ETA corresponding to the current speed profile and the RTA constraint is greater than a predetermined threshold, the piloting systems of the aircraft calculate a new speed profile of the aircraft so that the estimated time of arrival ETA corresponds to the RTA constraint. In the aforesaid example, they increase the speed of the aircraft. However, that sometimes has the consequence of shifting the speed profile to the maximum or minimum speed possible over the trajectory: the RTA constraint may then be located outside the range of possible arrival times [ETAmin, ETAmax], meaning that it is no longer possible to respect this time of arrival constraint.

BRIEF SUMMARY OF THE INVENTION

The object of the present invention is to remedy the aforesaid disadvantages. It relates to a method, for aiding the piloting of an aircraft, that is intended to aid the piloting of an aircraft with a view to respecting a time of arrival constraint at a waypoint during a phase of descent.

This method is noteworthy in that it is composed of the following steps:

a) an instant of arrival of the aircraft at an intermediate waypoint corresponding to a phase of cruising of the aircraft preceding the said phase of descent is determined, in such a way that an earliest time of arrival at this waypoint, corresponding to a maximum speed profile between the intermediate waypoint and the waypoint, is earlier by a predetermined first margin than the time of arrival constraint;

a) an instant of arrival of the aircraft at an intermediate waypoint is determined according to the following steps:

a1) this intermediate waypoint is selected in a phase of cruising of the aircraft preceding the said phase of descent;

a2) an earliest time of arrival at this waypoint is selected, earlier by a predetermined first margin than the time of arrival constraint;

a3) a minimum travel time corresponding to a maximum speed profile between the intermediate waypoint and the waypoint is estimated;

a4) the said instant of arrival of the aircraft at this intermediate waypoint that corresponds to the difference between the said earliest time of arrival at the waypoint selected in step a2) and the minimum travel time estimated in step a3) is determined;

b) a first speed profile between the current position of the aircraft and the intermediate waypoint is determined such that this intermediate waypoint is crossed at the instant calculated in step a);

c) a second speed profile is determined such that the waypoint is crossed within the said time of arrival constraint, starting from the intermediate waypoint at the instant calculated in step a); and d) the aircraft is piloted according to the said first then second speed profiles determined in steps b) and c).

In this way it is guaranteed that the aircraft will arrive at this intermediate waypoint at an instant for which the said second speed profile has a margin relative to the maximum speed profile. This margin makes it possible to greatly reduce the risk of not respecting the time of arrival constraint at the waypoint in the cases for which the real flight conditions of the aircraft are less favorable ahead of the aircraft than the forecast flight conditions, especially in the case of a stronger headwind than forecast, which would have the effect of reducing the maximum ground speed of the aircraft. The invention therefore makes it possible to react in anticipated manner to the effects of a change in flight conditions by establishing the said margin starting from the intermediate waypoint. In addition, given that this intermediate waypoint corresponds to a phase of cruising, it is easier for the aircraft to respect the said instant of arrival at this intermediate waypoint that to respect an instant of arrival at a point corresponding to a phase of descent: in fact, the flight conditions are more predictable in a phase of cruising (substantially constant altitude) than in a phase of descent, and also the aircraft can be guided more precisely in a phase of cruising than in a phase of descent.

Preferably, in step a), the instant of arrival of the aircraft at the intermediate waypoint is additionally determined according to the following steps:
 a'2) a latest time of arrival at this waypoint is selected, later by a second predetermined margin than the time of arrival constraint;
 a'3) a maximum travel time corresponding to a minimum speed profile between the intermediate waypoint and the waypoint is estimated;
 a'4) the said instant of arrival of the aircraft at this intermediate waypoint that corresponds to the difference between the said latest time of arrival at the waypoint selected in step a'2) and the maximum travel time estimated in step a'3) is determined, the latest time of arrival and the earliest time of arrival being selected respectively in steps a'2) and a2) in such a way that their difference corresponds to the difference between the maximum travel time and the minimum travel time estimated respectively in steps a'3) and a3).

That makes it possible to guarantee that the aircraft will arrive at this intermediate waypoint at an instant for which the said second speed profile has a margin relative to the minimum speed profile. This margin makes it possible to greatly reduce the risk of not respecting the time of arrival constraint at the waypoint in the cases for which the real flight conditions of the aircraft are more favorable ahead of the aircraft than the forecast flight conditions, especially in the case of a stronger tailwind than forecast, which would have the effect of increasing the minimum ground speed of the aircraft.

Advantageously, the predetermined first margin and second margin are defined by a coefficient K such that:

$$K = \frac{RTA - ETA\min@WPT(TD')}{ETA\max@WPT(TD') - ETA\min@WPT(TD')}$$

and
K>Kmin; where Kmin>0
K<Kmax; where Kmax<1.
where
RTA is the time of arrival constraint at the waypoint;
ETAmin@WPT(TD') is the earliest estimated time of arrival at the waypoint, determined by considering the aircraft at the intermediate waypoint at the said instant of arrival;
ETAmax@WPT(TD') is the latest estimated time of arrival at the waypoint, determined by considering the aircraft at the intermediate waypoint at the said instant of arrival.

The choice of an appropriate coefficient K makes it possible to define sufficient margins between the time of arrival constraint at the waypoint and on the one hand the latest estimated time of arrival and on the other hand the earliest estimated time of arrival at the waypoint, in such a way as to greatly reduce the risk of not respecting the said time of arrival constraint.

In one embodiment of the invention, the intermediate waypoint is situated at a predetermined distance ahead of the point of start of descent corresponding to the speed profile of the aircraft at the moment of acquisition of the RTA constraint. This predetermined distance is chosen in such a way that the said intermediate waypoint corresponds to the phase of cruising of the aircraft, whatever the second speed profile situated between the maximum speed profile and the minimum speed profile.

In a preferred embodiment of the invention, during the flight of the aircraft ahead of the intermediate waypoint, the estimated time of arrival at the waypoint is periodically recalculated, determined by considering the aircraft at the intermediate waypoint at the instant calculated in step a), taking into account the flight conditions known at the current instant. If the deviation between this estimated time of arrival and the time of arrival constraint at the waypoint is greater than a predetermined first threshold, steps a), b), c) and d) of the method according to the invention are restarted. That makes it possible to respect the time of arrival constraint at the waypoint as well as the said margins relative to this constraint.

Advantageously, during the flight of the aircraft ahead of the intermediate waypoint, an estimated time of arrival at the intermediate waypoint (calculated by considering the aircraft at its current position) is calculated periodically and, if the deviation between this estimated time of arrival at the intermediate waypoint and the instant calculated in step a) is greater than a predetermined second threshold, a new first speed profile between the current position of the aircraft and the intermediate waypoint is calculated, permitting this intermediate waypoint to be reached at the instant calculated in step a), then the aircraft is piloted according to this new first speed profile. In this way it is substantially guaranteed that the said instant of arrival at the intermediate waypoint will be respected and consequently that the said predefined margins up to this intermediate waypoint will be respected.

Also advantageously, during the flight of the aircraft between the intermediate waypoint and the waypoint, the estimated time of arrival at the waypoint is periodically recalculated, and if necessary the speed of the aircraft is regulated in such a way as to respect the time of arrival constraint at this waypoint.

In a preferred embodiment of the invention, the second speed profile between the intermediate waypoint and the waypoint is determined in terms of the ground speed of the aircraft, calculated according to the formula:

$$Vgd = \frac{Vgd\max}{1 + K\left(\frac{Vgd\max}{Vgd\min} - 1\right)}$$

in which:
Vgd is the ground speed of the aircraft;
Vgdmax is the maximum possible ground speed of the aircraft;
Vgdmin is the minimum possible ground speed of the aircraft.

This method of calculating the second speed profile has the advantage of ensuring that margins are maintained during the flight of the aircraft between the intermediate waypoint and the waypoint.

In another embodiment of the invention, the second speed profile between the intermediate waypoint and the waypoint is determined in terms of a cost index. This embodiment does not make it possible to maintain margins during the flight of the aircraft between the intermediate waypoint and the waypoint, but it has the advantage of being easy to implement in current aircraft-guidance systems. Advantageously, the first speed profile is also determined in terms of cost index.

The invention also relates to a device for aiding the piloting of an aircraft with a view to respecting a time of arrival constraint at a waypoint during a phase of descent, comprising a flight management system which includes:
  means for estimating a travel time between two points of a forecast trajectory of the aircraft as a function of a speed profile between these two points;
  means for calculating an instant of arrival at an intermediate waypoint as a function of:
    the said time of arrival constraint at the waypoint;
    a maximum travel time and a minimum travel time between this intermediate waypoint and the waypoint, estimated by the said estimating means, corresponding respectively to a minimum speed profile and to a maximum speed profile between the intermediate waypoint and the waypoint; and
    a coefficient K representative of a predetermined first margin between the said time of arrival constraint at the waypoint and an earliest estimated time of arrival at this waypoint, corresponding to the minimum travel time, as well as a predetermined second margin between a latest estimated time of arrival at this waypoint, corresponding to the maximum travel time, and the said time of arrival constraint at the waypoint;
  means for determining a first speed profile between the current position of the aircraft and the intermediate waypoint, such that this intermediate waypoint is crossed at the instant calculated by the said calculating means; and
  means for determining a second speed profile between the intermediate waypoint at the instant calculated by the said calculating means and the waypoint at the said time of arrival constraint.

The invention also relates to an aircraft equipped with such a device for aiding the piloting.

BRIEF DESCRIPTION OF THE DRAWINGS

The invention will be better understood by reading the description hereinafter and by examining the attached figures.

DETAILED DESCRIPTION OF THE INVENTION

Figure 1:
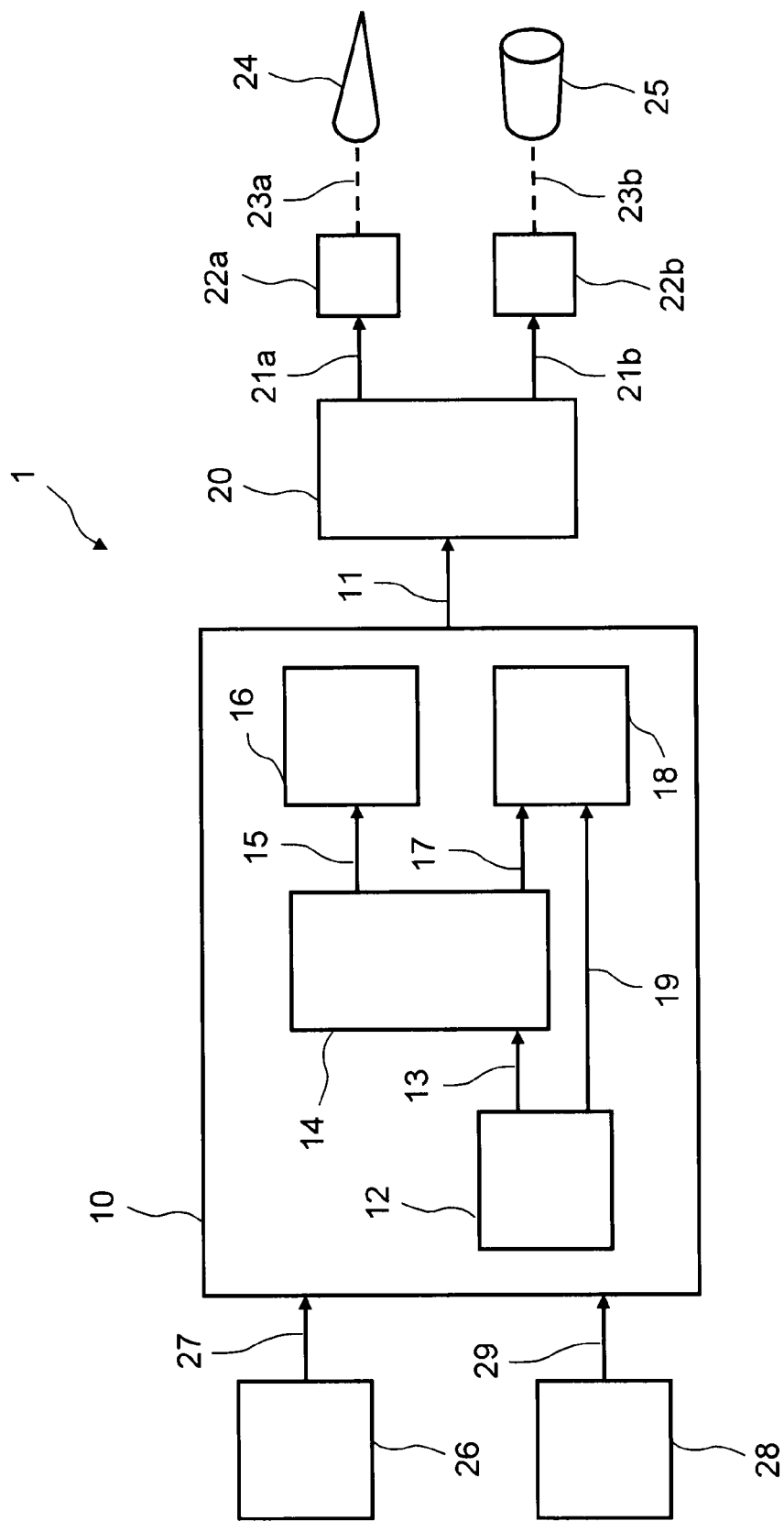
FIG. 1 is a block diagram of a device according to the invention for aiding the piloting of an aircraft.
Figure 2:
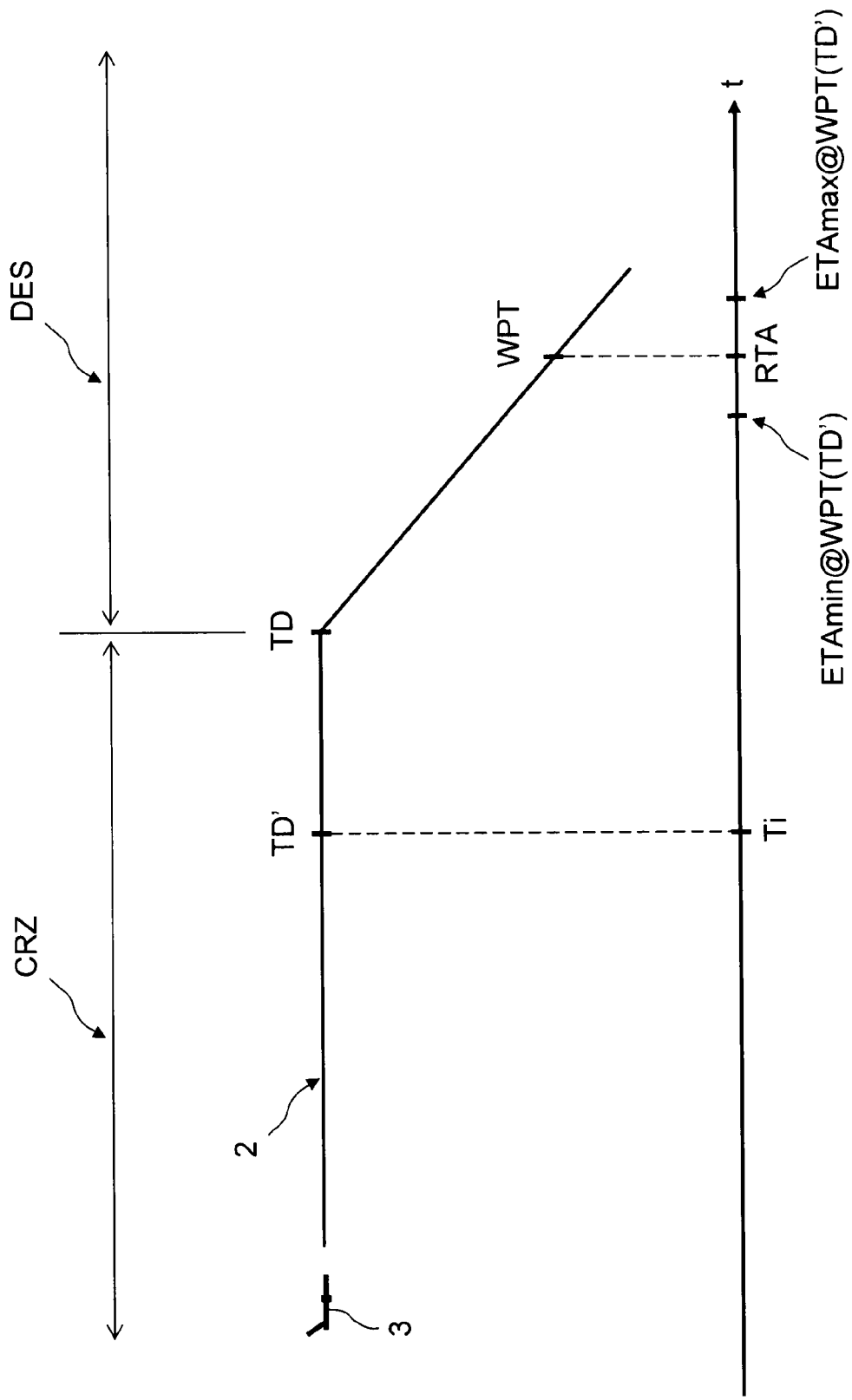
FIG. 2 represents a view in vertical section of a trajectory of an aircraft according to a flight plan that includes a phase of descent.

Device 1 represented schematically on FIG. 1 is according to a preferred embodiment of the invention. It is installed on board an aircraft 3, especially a civil transportation airplane or a military transportation airplane, with a view to aiding this aircraft in flying a phase of descent, particularly during an approach to a landing runway, while respecting a time of arrival constraint RTA at a waypoint WPT during the said descent. FIG. 2 represents the desired trajectory 2 of aircraft 3 as a function of the time t: after a phase of cruising CRZ to a point TD of start of descent, the aircraft flies a phase of descent DES, during which it must arrive at the point WPT at the said time of arrival RTA.

This device 1 usually comprises:
  customary means 26, such as a keyboard of a unit of MCDU type ("Multifunction Control and Display Unit" in English) for interfacing with the pilots, permitting a pilot to enter at least one time of arrival constraint RTA associated with at least one waypoint of the flight plan of the aircraft;
  a set 28 of information sources that are capable of determining values of parameters relating to the flight of the aircraft, such as wind, temperature, position and speed of the aircraft;
  a system 10 for management of the flight of the aircraft, especially of FMS type, which is connected by way of links 27 and 29 respectively to means 26 and to the set of information sources 28, which transmits information items thereto via these links. This flight management system determines a reference trajectory of the aircraft and a speed profile along the said trajectory, as a function in particular of the said information items;
  a flight calculator 20 of FG type ("Flight Guidance" in English), which is connected to flight management system 10 by a link 11 and which receives information items therefrom, especially the said reference trajectory and the said speed profile. This flight calculator determines the guidance instructions for the aircraft from the said information items;
  a set of customary means 22a for actuating control elements 24 of the aircraft that are capable of acting on the flight of the aircraft, such as aircraft control surfaces. Via a set of links 21a, the actuating means receive the instructions formulated by flight calculator 20 and consequently actuate control elements 24, as represented by the set of links 23a in FIG. 1; and
  means 22b for automatic control of the thrust of the aircraft engines 25, which means receive the instructions formulated by flight calculator 20 via a link 21b and consequently control the thrust of engines 25 as represented by link 23b in FIG. 1. These means for automatic control of the thrust may be, for example, of auto-throttle or auto-thrust type ("Auto-Thrust" in English).

According to the invention, flight management system 10 comprises:
  means 12 for estimating a travel time between two points of a forecast trajectory of the aircraft as a function of a speed profile between these two points;
  means 14 for calculating an instant Ti of arrival at an intermediate waypoint TD' as a function of:
    the said time of arrival constraint RTA at the waypoint WPT;
    a maximum travel time Tmax and a minimum travel time Tmin between this intermediate waypoint TD' and the waypoint WPT, estimated by the said estimating means 12 (and transmitted via a link 13 between estimating means 12 and calculation means 14), corresponding respectively to a minimum speed profile and to a maximum speed profile between the intermediate waypoint TD' and the waypoint WPT; and
    a coefficient K representative of a predetermined first margin between the time of arrival constraint RTA at the waypoint WPT and an earliest estimated time of arrival ETAmin@WPT(TD') at this waypoint (estimated by considering the aircraft at the intermediate waypoint TD' at the instant Ti), corresponding to the minimum travel time Tmin, as well as a predetermined second margin between a latest estimated time of arrival ETAmax@WPT(TD') at this waypoint (estimated by considering the aircraft at the intermediate waypoint TD' at the instant Ti), corresponding to a maximum travel time Tmax, and the said time of arrival constraint RTA at the waypoint WPT;

means 16 for determining a first speed profile between the current position of the aircraft and the intermediate waypoint TD', such that this intermediate waypoint is crossed at the instant Ti calculated by calculating means 14 (means 16 receiving the value of Ti via a link 15 between calculating means 14 and means 16); and means 18 for determining a second speed profile between the intermediate waypoint TD' at the instant Ti and the waypoint WPT at the time of arrival constraint RTA (means 18 receiving the value of Ti via a link 17 between calculating means 14 and means 18).

The said means 12, 14, 16 and 18 are preferably implemented in the form of software functionalities of flight management system 10.

Flight management system 10 sends to flight calculator 20, via link 11, the information items of instructions corresponding to the trajectory of the aircraft as well as to the first and second speed profiles, and flight calculator 20 pilots the aircraft automatically as a consequence.

Intermediate waypoint TD' is situated at a predetermined distance ahead of the point of the start of descent TD corresponding to the speed profile of the aircraft at the moment of acquisition of the RTA constraint. This predetermined distance is chosen in such a way that the said intermediate waypoint corresponds to the phase of cruising of the aircraft, whatever the second speed profile situated between the maximum speed profile and the minimum speed profile. By way of example, this predetermined distance may be chosen within an interval of 40 to 50 nautical miles (74 to 93 kilometers). Even before the start of descent, therefore, it is anticipated that time margins between the RTA constraint and the earliest and latest times of arrival at the point WPT will be respected.

Means 12 for estimating a travel time are the customary means that are used for estimating a maximum travel time Tmax and a minimum travel time Tmin between the intermediate waypoint TD' and the said waypoint WPT, corresponding respectively to a minimum speed profile and to a maximum speed profile between these two points. The difference Tmax−Tmin is equal to the time interval between an earliest estimated time of arrival ETAmin@WPT(TD') at the point WPT, corresponding to this minimum travel time Tmin, and a latest estimated time of arrival ETAmax@WPT(TD') at the point WPT, corresponding to this maximum travel time Tmax, these times of arrival ETAmin@WPT(TD') and ETAmax@WPT(TD') being estimated by considering the aircraft at the intermediate waypoint TD' at the instant Ti. There is therefore obtained the relationship:

$$\text{ETAmax@WPT(TD')} - \text{ETAmin@WPT(TD')} = T\text{max} - T\text{min} \tag{1}$$

The coefficient K, representative on the one hand of the predetermined first margin between the RTA constraint and the earliest estimated time of arrival ETAmin@WPT(TD'), and on the other hand of the predetermined second margin between the RTA constraint and the latest estimated time of arrival ETAmax@WPT(TD') is preferably chosen equal to:

$$K = \frac{RTA - ETA\text{min@}WPT(TD')}{ETA\text{max@}WPT(TD') - ETA\text{min@}WPT(TD')} \tag{2}$$

This coefficient K is chosen in an interval [Kmin; Kmax] such that Kmin>0 and Kmax<1. The use of the said coefficient K makes it possible to define the first time margin RTA−ETAmin@WPT(TD') by a ratio of the time interval [ETAmin@WPT(TD'); ETAmax@WPT(TD')]. The second time margin ETAmax@WPT(TD')−RTA corresponds to the complement of the first time margin in the time interval [ETAmin@WPT(TD'); ETAmax@WPT(TD')].

In order that the said first and second time margins are sufficient to permit the RTA constraint to be respected, it is advisable to choose values of Kmin sufficiently greater than 0 and of Kmax sufficiently smaller than 1. For example, when the risk that the RTA constraint will not be respected is balanced between a risk of being late and a risk of being early at waypoint WPT, K may be chosen within an interval [Kmin; Kmax] corresponding substantially to the interval [0.3; 0.7], especially K close to 0.5. When the risk that the RTA constraint will not be respected is substantially a risk of being late at waypoint WPT, the first time margin is given priority relative to the second time margin. For that purpose, it is possible, for example, to choose K in an interval [Kmin; Kmax] corresponding substantially to the interval [0.4; 0.85], especially K close to 0.7. When the risk that the RTA constraint will not be respected is substantially a risk of being early at waypoint WPT, the second time margin is given priority relative to the first time margin. For that purpose, it is possible, for example, to choose K in an interval [Kmin; Kmax] corresponding substantially to the interval [0.15; 0.6], especially K close to 0.3.

The minimum travel time Tmin and maximum travel time Tmax between the intermediate waypoint TD' and the waypoint WPT are such that:

$$\text{ETAmin@WPT(TD')} = Ti + T\text{min} \tag{3}$$

$$\text{ETAmax@WPT(TD')} = Ti + T\text{max} \tag{4}$$

Consequently, it results from relationships (2), (3) and (4) that the instant Ti of arrival at the intermediate waypoint TD' can be calculated from the following relationship:

$$Ti = RTA - T\text{min} - K(T\text{max} - T\text{min}) \tag{5}$$

Means 16 determine a first speed profile of the aircraft, making it possible to intersect the intermediate waypoint TD' at the instant Ti, starting from the current position of the aircraft during the determination of the said first profile. This first speed profile may be expressed, for example, in the form of a constant ground speed Vgd of the aircraft between the said current position of the aircraft and the intermediate waypoint TD'. This speed Vgd is determined by the relationship:

$$Vgd = \frac{D}{Ti - T0} \tag{6}$$

in which:
- D is the distance, along the scheduled trajectory, between the current position X of the aircraft and the intermediate waypoint TD';
- T0 is the current instant corresponding to the current position X of the aircraft.

This first speed profile may also be expressed in the form of an airspeed of the aircraft. In the absence of wind, this airspeed corresponds to the ground speed Vdg of the aircraft. Nevertheless, means 16 preferably take into account forecast flight conditions, especially the wind, over the trajectory scheduled between the current position of the aircraft and the intermediate waypoint TD'. The airspeed of the aircraft is then determined by correcting relationship (6) to take the effect of the wind into account.

Alternatively, the first speed profile may also be expressed in the form of a cost index.

Means 18 determine a second speed profile Vp2 of the aircraft, making it possible to cross the waypoint WPT within the time of arrival constraint RTA, starting from the intermediate waypoint TD' at the instant Ti. For that purpose, means 18 proceed by successive iterations: they select a speed profile that they submit to means 12, which estimate a travel time Tp between the intermediate waypoint TD' and the said waypoint WPT for this speed profile. Means 12 relay the value of Tp to means 18 via a link 19. Means 18 then calculate an estimated time of arrival ETA@WPT(TD') at the waypoint WPT (estimated by considering the aircraft at the intermediate waypoint TD' at the instant Ti) for this speed profile, using the relationship:

$$ETA@WPT(TD')=Ti+Tp \qquad (7)$$

Figure 3:
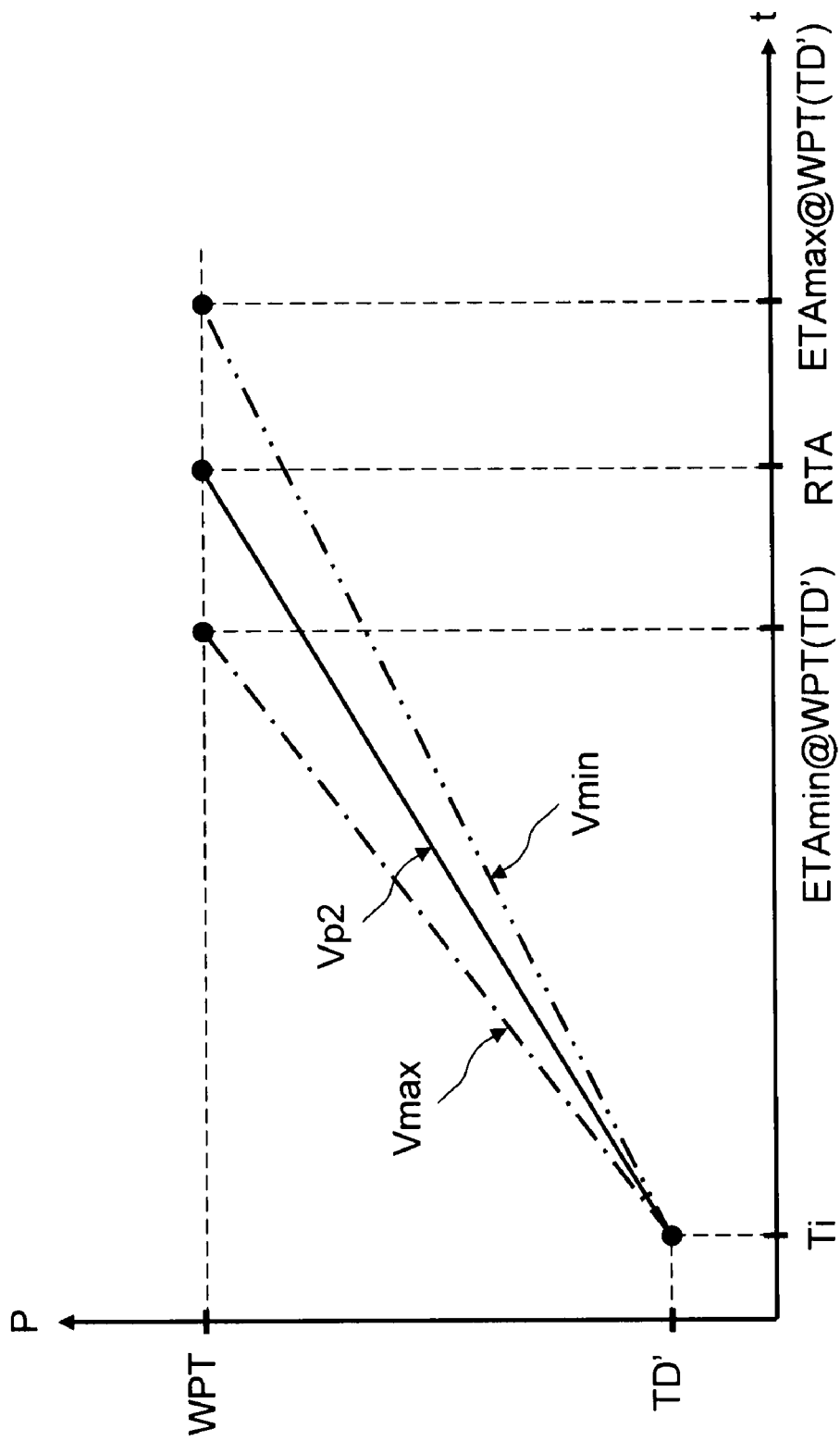
FIG. 3 represents the position of the aircraft as a function of time, between two points situated on the flight plan, for different values of the speed of the aircraft.

As long as this value ETA@WPT(TD') is substantially different from the time of arrival constraint RTA, means 18 select a new speed profile for which they determine, in similar manner, a new estimated time of arrival ETA@WPT(TD') at the waypoint WPT. The successively selected speed profiles are determined in such a way that the estimated values ETA@WPT(TD') approach the RTA constraint as the number of iterations increases. For that purpose, the speed values corresponding to a selected new speed profile are chosen to be greater than the values of speed corresponding to a previously selected speed profile, for which the estimated time of arrival ETA@WPT(TD') was later than the RTA constraint. In addition, the speed values corresponding to a selected new speed profile are chosen to be smaller than the values of speed corresponding to a previously selected speed profile, for which the estimated time of arrival ETA@WPT(TD') was earlier than the RTA constraint. When a selected speed profile is such that the absolute value of the difference between the estimated time of arrival ETA@WPT(TD') at the waypoint WPT and the time of arrival constraint RTA is smaller than a predetermined threshold, this selected speed profile is chosen as the second speed profile Vp2. FIG. 3 illustrates the evolution of the position P of the aircraft as a function of the time t between the intermediate waypoint TD' and the waypoint WPT for a maximum speed profile Vmax, for the said second speed profile Vp2 and for a minimum speed profile Vmin, for which the estimated time of arrival at the waypoint WPT corresponds respectively to ETAmin@WPT(TD'), RTA and ETAmax@WPT(TD'). Although the evolution of the position of the aircraft between the points TD' and WPT is represented by linear plots in FIG. 3, it may also correspond to curves of different shape, depending on the speed profiles.

The second speed profile may be expressed in the form of a ground speed Vgd of the aircraft. It results from relationship (2) that the ground speed Vdg(P) of the aircraft at a point P of the trajectory between the intermediate waypoint TD' and the waypoint WPT can be determined by the relationship:

$$Vgd(P) = \frac{Vgd\max(P)}{1+K\left(\frac{Vgd\max(P)}{Vgd\min(P)}-1\right)} \qquad (8)$$

in which:
Vgdmax(P) is the maximum possible ground speed of the aircraft at the point P;
Vgdmin(P) is the minimum possible ground speed of the aircraft at the point P.

This method of calculating the second speed profile has the advantage of ensuring that the said margins are preserved during the entire flight of the aircraft between the intermediate waypoint TD' and the waypoint WPT.

Alternatively, this second speed profile may be expressed in the form of a cost index. Such a cost index generally increases as a function of the speed of the aircraft. In known manner, it may be expressed in particular in the form of a CAS/MACH pair, where CAS denotes a calibrated airspeed ("Calibrated Air Speed" in English) of the aircraft and MACH denotes the Mach number of the aircraft. Such a CAS/MACH pair corresponds to a segment of flying at constant Mach number followed by a segment of flying at constant calibrated airspeed. Such a speed profile does not make it possible to preserve the said margins between the intermediate waypoint TD' and the waypoint WPT, but it has the advantage of being easy to implement in the flight management systems FMS and in the current flight calculators FG of aircraft that are already using cost indices for the definition of speed profiles.

The fact of bringing the aircraft to an intermediate waypoint TD' at an instant determined according to the invention is advantageous, because, starting from that instant Ti, the aircraft is provided with margins between the time of arrival constraint RTA at the waypoint WPT and the earliest and latest estimated times of arrival ETAmin@WPT(TD') and ETAmax@WPT(TD') at this waypoint. An appropriate choice of the said margins, expressed by the coefficient K, as indicated hereinabove, makes it possible to achieve a very great reduction in the risk that the said RTA constraint will not be respected.

During the flight of the aircraft ahead of the intermediate waypoint TD', the estimated time of arrival ETA@WPT(TD') at the waypoint WPT is periodically recalculated (for example at intervals of between 1 and 5 minutes), which time is determined by considering the aircraft at the intermediate waypoint TD' at the instant Ti, taking into account the flight conditions known at the current instant. If the deviation between this estimated time of arrival and the time of arrival constraint RTA at the waypoint WPT is greater than a predetermined first threshold, for example between 5 and 30 seconds, steps a), b), c) and d) of the method according to the invention are restarted. That makes it possible to respect the time of arrival constraint RTA at the waypoint, as well as the said margins (defined by the coefficient K) relative to this constraint.

In addition, during the flight of the aircraft ahead of the intermediate waypoint TD', an estimated time of arrival ETA@TD'(X) at the intermediate waypoint (TD') is periodically calculated (for example, at intervals of between 1 and 5 minutes), which time is determined by considering the aircraft at its current position X, and if the deviation between this estimated time of arrival at this intermediate waypoint (calculated at the current instant) and the instant Ti is greater than a predetermined second threshold, for example between 15 and 30 seconds, a new first speed profile between the current position of the aircraft and the intermediate waypoint is calculated such that this intermediate waypoint can be reached at the instant calculated in step a), then the aircraft is piloted according to this new first speed profile. In this way it is substantially guaranteed that the said instant of arrival at the intermediate waypoint will be respected and consequently that the said predefined margins will be respected up to this intermediate waypoint.

Thereafter, during the flight of the aircraft between the intermediate waypoint TD' and the waypoint WPT, the estimated time of arrival at the waypoint is periodically recalculated, and flight calculator 20 regulates the speed of the aircraft if necessary in such a way as to respect the time of arrival constraint RTA at this waypoint.

The invention claimed is:
1. A method for aiding the piloting of an aircraft, while respecting a time of arrival constraint at a first waypoint during a phase of descent, comprising:
   calculating an instant of arrival of the aircraft at an intermediate waypoint according to the following steps:
      selecting the intermediate waypoint in a phase of cruising of the aircraft preceding the phase of descent;
      selecting an earliest time of arrival at the first waypoint, wherein the earliest time of arrival at the first waypoint occurs earlier by a predetermined first margin than the time of arrival constraint;
      estimating a minimum travel time corresponding to a maximum speed profile between the intermediate waypoint and the first waypoint; and
      determining the instant of arrival of the aircraft at the intermediate waypoint, the instant of arrival corresponding to a difference between the selected earliest time of arrival at the first waypoint and the estimated minimum travel time;
   determining a first speed profile between a current position of the aircraft and the intermediate waypoint, such that the intermediate waypoint is crossed at the calculated instant of arrival;
   determining a second speed profile, such that the first waypoint is crossed within the time of arrival constraint, starting from the intermediate waypoint at the calculated instant of arrival; and
   piloting the aircraft according to the first and then second speed profiles,
   wherein the first speed profile is expressed in terms of a constant ground speed Vgd of the aircraft between the said current position of the aircraft and the intermediate waypoint, said speed Vgd being determined by the relationship:

$$Vgd = \frac{D}{Ti - T0}, \text{ wherein}$$

D is a distance, along a scheduled trajectory, between a current position X of the aircraft and the intermediate waypoint; Ti is the calculated instant of arrival; and T0 is the current instant corresponding to the current position X of the aircraft.
2. The method according to claim 1, wherein the calculating the instant of arrival of the aircraft at the intermediate waypoint is additionally determined according to the following steps:
   selecting a latest time of arrival at the first waypoint, wherein the latest time of arrival at the waypoint occurs later by a predetermined second margin than the time of arrival constraint;
   estimating a maximum travel time corresponding to a minimum speed profile between the intermediate waypoint and the first waypoint;
   determining the instant of arrival of the aircraft at the intermediate waypoint, the instant of arrival corresponding to a difference between the selected latest time of arrival at the first waypoint and the estimated maximum travel time, wherein
   the latest time of arrival and the earliest time of arrival are selected such that a difference therebetween corresponds to a difference between the estimated maximum travel time and the estimated minimum travel time.
3. The method according to claim 1, wherein the second speed profile between the intermediate waypoint and the first waypoint is determined in terms of a cost index.
4. The method according to claim 1, wherein the intermediate waypoint is situated at a predetermined distance ahead of a point of start of descent, and corresponds to a speed profile of the aircraft at a moment of acquisition of the time of arrival constraint at the first waypoint.
5. The method according to claim 1, wherein,
   during a flight of the aircraft ahead of the intermediate waypoint, an estimated time of arrival at the first waypoint is periodically recalculated,
   the estimated time of arrival is determined by considering the aircraft to be located at the intermediate waypoint at the calculated instant of arrival, taking into account flight conditions known at a current instant and,
   the method is restarted when the deviation between the estimated time of arrival and the time of arrival constraint at the first waypoint is greater than a predetermined first threshold.
6. The method according to claim 1, wherein,
   during a flight of the aircraft ahead of the intermediate waypoint, an estimated time of arrival at the intermediate waypoint is calculated periodically, determined by considering a current position of the aircraft and,
   when the deviation between the estimated time of arrival at the intermediate waypoint and the calculated instant of arrival is greater than a predetermined second threshold, a new first speed profile between the current position of the aircraft and the intermediate waypoint is calculated permitting the intermediate waypoint to be reached at the calculated instant of arrival, and the aircraft is piloted according to the new first speed profile.
7. The method according to claim 1, wherein the first speed profile is adjusted to account for wind in the trajectory of the aircraft.
8. A method for aiding the piloting of an aircraft, while respecting a time of arrival constraint at a first waypoint during a phase of descent, comprising:
   calculating an instant of arrival of the aircraft at an intermediate waypoint according to the following steps:
      selecting the intermediate waypoint in a phase of cruising of the aircraft preceding the phase of descent;
      selecting an earliest time of arrival at the first waypoint, wherein the earliest time of arrival at the first waypoint occurs earlier by a predetermined first margin than the time of arrival constraint;
      estimating a minimum travel time corresponding to a maximum speed profile between the intermediate waypoint and the first waypoint; and
      determining the instant of arrival of the aircraft at the intermediate waypoint, the instant of arrival corresponding to a difference between the selected earliest time of arrival at the first waypoint and the estimated minimum travel time;
   determining a first speed profile between a current position of the aircraft and the intermediate waypoint, such that the intermediate waypoint is crossed at the calculated instant of arrival;
   determining a second speed profile, such that the first waypoint is crossed within the time of arrival constraint, starting from the intermediate waypoint at the calculated instant of arrival; and
   piloting the aircraft according to the first and then second speed profiles, wherein the calculating the instant of arrival of the aircraft at the intermediate waypoint is additionally determined according to the following steps:

selecting a latest time of arrival at the first waypoint, wherein the latest time of arrival at the waypoint occurs later by a predetermined second margin than the time of arrival constraint;

estimating a maximum travel time corresponding to a minimum speed profile between the intermediate waypoint and the first waypoint;

determining the instant of arrival of the aircraft at the intermediate waypoint, the instant of arrival corresponding to a difference between the selected latest time of arrival at the first waypoint and the estimated maximum travel time, wherein the latest time of arrival and the earliest time of arrival are selected such that a difference therebetween corresponds to a difference between the estimated maximum travel time and the estimated minimum travel time, and wherein the predetermined first margin and the predetermined second margin are defined by a coefficient K such that:

$$K = \frac{RTA - ETAmin@WPT(TD')}{ETAmax@WPT(TD') - ETAmin@WPT(TD')}$$

and
K>Kmin; where Kmin>0

K<Kmax; where Kmax<1,
wherein

RTA is the time of arrival constraint at the first waypoint;

ETAmin@WPT(TD') is the earliest estimated time of arrival at the first waypoint, determined by considering the aircraft to be located at the intermediate waypoint at the instant of arrival; and ETAmax@WPT(TD') is the latest estimated time of arrival at the first waypoint, determined by considering the aircraft to be located at the intermediate waypoint at the instant of arrival.

9. The method according to claim 8, wherein the second speed profile between the intermediate waypoint and the first waypoint is determined in terms of a ground speed of the aircraft according to the formula:

$$Vgd(P) = \frac{Vgd\max(P)}{1 + K\left(\frac{Vgd\max(P)}{Vgd\min(P)} - 1\right)}$$

wherein:

Vgd(P) is a ground speed of the aircraft at a point P of its trajectory;

Vgdmax(P) is a maximum possible ground speed of the aircraft at the point P; and Vgdmin(P) is a minimum possible ground speed of the aircraft at the point P.

* * * * *